May 11, 1926.
J. E. KENNEDY
1,584,305
OPERATING DEVICE FOR AUTOMOBILE HEADLIGHT SWITCHES
Filed April 25, 1923
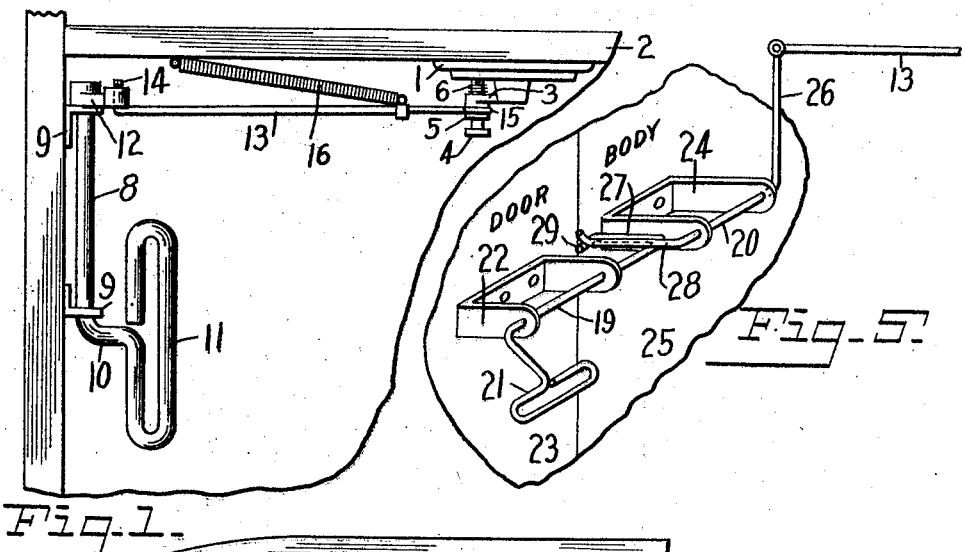
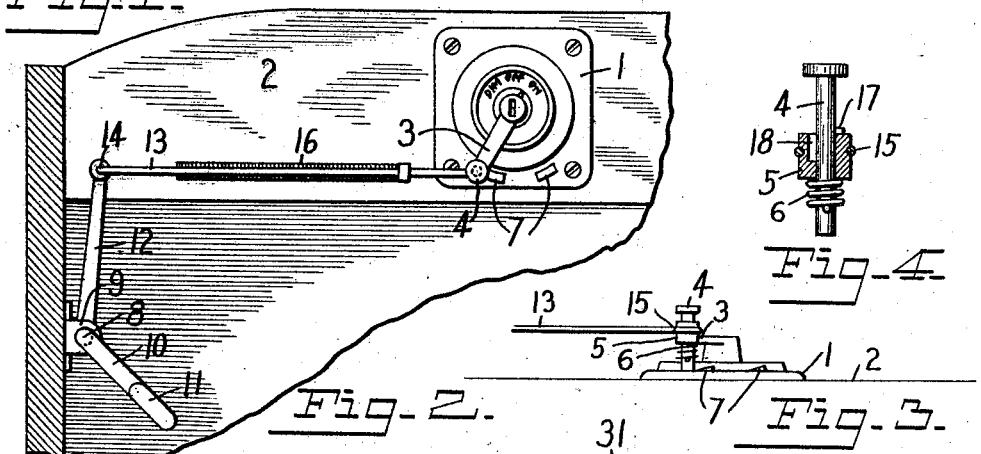
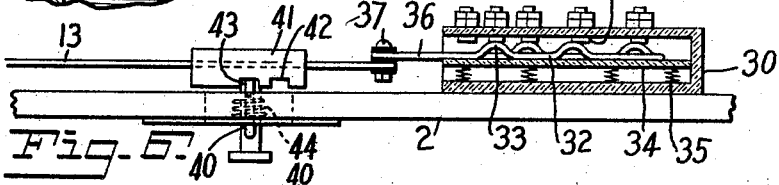
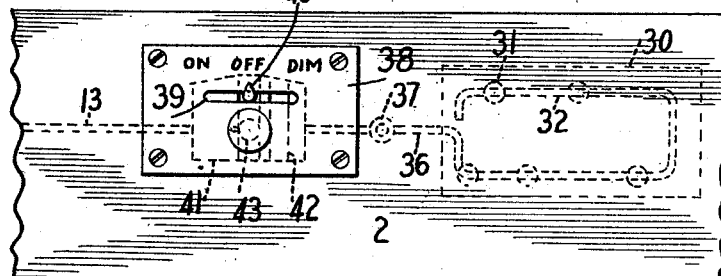
Inventor
JOHN E. KENNEDY.
Attorney Patented May 11, 1926.

1,584,305

UNITED STATES PATENT OFFICE.

JOHN ELDY KENNEDY, OF DAYTON, OHIO, ASSIGNOR OF ONE-HALF TO CLARENCE E. MORFORD, OF DAYTON, OHIO.

OPERATING DEVICE FOR AUTOMOBILE HEADLIGHT SWITCHES.

Application filed April 25, 1923. Serial No 634,530.

This invention relates to an operating device for automobile head lights and one object of the invention is to provide a device by means of which the head lights of an automobile may be dimmed without interfering with the operation of the automobile or requiring the operator to divert his gaze from the road.

To this end a further object of the invention is to provide means to be actuated by the knee of the driver for operating the switch.

A further object of the invention is to provide a device of this kind which will be very simple in its construction and operation; and which can be readily attached to a suitable head light switch.

Other objects of the invention will appear as the device is described in detail.

In the accompanying drawings Fig. 1 is a plan view of a switch operating device embodying my invention; Fig. 2 is a front elevation of the same; Fig. 3 is an edge view of a switch plate and a switch actuating member; Fig. 4 is a detail view of the locking detent for the switch actuating member; Fig. 5 is a perspective view of a switch operating device in which the operating member is carried by the door of the automobile; Fig. 6 is a plan view, partly in section, showing the operating device connected with a switch having a slidable contact member; and Fig. 7 is a front elevation of such a device.

As is well known the glare of the head lights of an automobile tend to blind and to seriously interfere with the driver of an approaching automobile and it is customary, and in some States required by law, for the driver to dim his head lights when passing another vehicle. The head light switch is usually arranged on the instrument board and, while readily accessible, is so located that the driver must change his position and often take his eyes from the road in order to operate the same. When the automobile is being operated on a thoroughfare where the traffic is heavy and it is necessary to frequently dim the head lights this operation is very inconvenient and interferes seriously with the proper operation of the automobile. In order to overcome this objectionable feature I have provided an operating device for a head light switch which may be located at a point remote from the switch and operated by the driver without changing his position or diverting his gaze from the road. Preferably the operating device is arranged to be actuated by the knee of the operator and to this end is mounted on the side of the body adjacent to the driver's knee. In the present drawings I have illustrated one embodiment of this actuating device, together with a modification thereof but it will be understood that these have been chosen for the purposes of illustration only and the device may take various forms and may be mounted in various positions without departing from the spirit of the invention.

In Figs. 1 and 2, I have shown the operating device in connection with a head light switch of a well known construction. This particular switch comprises a switch plate 1 mounted on the instrument board 2 and having a switch actuating member in the end of an arm 3. Mounted on the outer end of this arm is a locking device which is here shown as a spring detent 4 slidably mounted in a boss 5 at the outer end of the arm and acted upon by a spring 6 which tends to hold the same normally in its innermost or locking position. In this position it is adapted to engage one of a plurality of stops or lugs 7 on the switch plate 1. In the present instance, the detent 4 extends beyond the outer side of the boss 5 and constitutes a handle by means of which the switch arm may be actuated. The switch plate is usually provided with indications to indicate the position of the switch, that is, whether the head lights are "on", "off" or "dim". In applying the invention to such a switch I provide an operating device which is mounted at a point remote therefrom and which, in the present instance, consists of a rock shaft 8 mounted in bearing lugs 9 which may be mounted on the side wall of the automobile body. An operating member is secured to this rock shaft and is so arranged with relation to the knee of the driver that a slight lateral movement of the knee will impart a rocking movement to the shaft. This operating member may take various forms but as here shown, the end of the shaft is bent at right angles to the axis thereof to form a crank arm 10 and the lower end of this crank arm is bent transversely to the arm to form a pressure member 11 of such length it may be readily engaged by the knee of the operator. The rock shaft is also provided with a second crank arm 12 which, in the present instance, extends upwardly therefrom at that end thereof opposite the operating member. The operating member and the rock arm 12 may be arranged on the outer sides of the respective bearings so as to hold the rock shaft against lengthwise movement without the use of additional parts. The crank arm 12 may be connected with the switch actuating member 3 in any suitable manner but preferably a connecting rod 13 is pivotally connected at one end with the rock arm 12 and at the other end with the actuating member. As here shown, the connecting rod has a laterally extending portion or pin 14 which projects through an eye in the rock arm 12, and is provided at its opposite end with a loop 15 which encircles the boss 5 of the actuating arm. The operating device is acted upon by a spring which tends to return the switch actuating arm to its initial position which, in the present instance, is its "on" position. As here shown, a coil spring 16 is secured at one end to the connecting rod 13 and at the other end with the instrument board and so arranged that it will impart lengthwise movement to the connecting rod. It will be apparent, therefore, that when pressure is applied to the operating member the connecting rod will be moved in a direction to shift the switch actuated member from its "on" to its "dim" position and, when the switch actuating member is unrestrained the spring 16 will return the same to its "on" position, as soon as the pressure on the operating device has been relieved. To prevent the detent 4 of the switch actuating arm from interfering with the return movement of the arm it is provided with means for securing it in an inoperative position. As here shown, a pin 17 extends laterally from the detent 4 and is adapted to move in a slot 18 in the boss 5 of the arm 3 when the detent rides over the stops 7. By retracting the detent so as to withdraw the pin 17 from the slot 18 and then rotating the detent to bring the pin in line with an unslotted portion of the boss, the detent will be locked in an inoperative position and the switch arm will be controlled wholly by the operating device and the spring 16.

In some styles of automobile bodies it is necessary, in order that the operating member of the switch operating device may be properly located with relation to the driver's knee, that this member be mounted on one of the doors of the automobile, and in Fig. 5 of the drawings I have shown a construction in which the operating member may be so mounted without interfering with the opening and closing of the door. As here shown, the operating device consists of two rock shafts, 19 and 20, which constitute in effect a two part shaft. The part 19 of the rock shaft, which carries the operating member 21, is mounted in the lugs of a bearing bracket 22 which is secured to the door 23. The second part 20 of the two part shaft is mounted in the lugs of a bearing bracket 24 which is secured to a fixed part 25 of the automobile body adjacent to the edge of the door. The part 20 of the two part shaft is provided with a rock arm 26 to which the connecting rod 13 is attached. The two parts of the rock shaft are normally disconnected one from the other but are provided with means whereby the movement of one part of that shaft will be transmitted to the other part thereof. As here shown, the adjacent ends of the two part shaft are provided with laterally extending arms 27 and 28, which, in the present instance, extend substantially horizontally toward the wall of the automobile body. The arm 27, which is carried by the part 19 of the shaft, is provided with an offset portion or finger 29 which extends beneath the outer end portion of the arm 28 of the part 20 of the shaft, and the arm 27 lies below the arm 28 of the part 20 of the shaft. Consequently when the door 23 is operated the part 19 is free to swing with the door independently of the part 20 of the shaft, but when the door is closed and pressure is applied to the operating member 21 the finger 29 will engage the arm 28 and cause the part 20 of the shaft to be rocked with the part 19 thereof, thus causing the switch actuating member to be operated. When the part 20 of the shaft is returned to its normal position by the action of the spring 16 the arm 28 will move the arm 27 and part 19 of the shaft to their normal positions.

It will be obvious that the operating device may be connected with switches of various kinds and in Figs. 6 and 7, I have shown the same as applied to a switch having a slidable contact member. The switch as there shown consists of a casing 30 open at one end but having mounted in the outer wall thereof a series of contacts 31 adapted to be engaged by a slidable contact member 32. This contact member may consist of a loop of wire, as shown in Fig. 7, having substantially parallel sides and having these sides provided with bends or projections 33 so arranged that different contacts 31 will be connected thereby when it is in different positions. The slidable contact member is held firmly in engagement with the fixed contact members by a yieldable plate 34 upon which it rests and which is acted upon by springs 35 to press the contact member toward the fixed contacts. One end of the slidable contact member projects beyond the casing 30, as shown at 36, and constitutes the actuating member for the switch and this actuating member may be connected with the connecting rod 13 of the operating device, as shown at 37, the two parts being preferably insulated one from the other. If desired, an indicator may be provided to indicate the position of the slidable contact member 32 and, as here shown, I have mounted on the instrument board 2 adjacent to the open end of the casing 30, an indicator plate 38 having thereon indications of the three positions of the switch. This indicator plate and the adjacent part of the instrument board are provided with a longitudinal slot 39 through which projects a pointer 40 which is rigidly secured to and moves with the connecting rod 13. Means may also be provided for locking this switch in adjusted positions and, as here shown, a locking block 41 is rigidly secured to the connecting rod 13 and is provided with notches 42 adapted to receive the end of a locking pin or detent 43 which is slidably mounted on the instrument board and which is acted upon by a spring 44 to hold it normally in locking engagement with the block 41. This locking pin may be provided with means for retaining it in an inoperative position, such as shown in Fig. 4.

The operation of the device will be readily understood from the foregoing description and it will be apparent that I have provided a very simple but positive switch operating device which is of such a character and so arranged that the switch can be quickly and easily shifted from one position to another by a very slight lateral movement of the operator's knee, which can be accomplished without other change in the position of the operator. It will further be apparent that the device is of such a character that it can be quickly and easily applied to a standard switch, if desired, and that the operating device may be mounted upon the door of an automobile without interfering with the use of the door.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. An operating mechanism for a headlight switch comprising an operating device, means for pivotally mounting said operating device on the side wall of the body of an automobile, means for operatively connecting said operating device with said switch, and yieldable means acting on said operating device to restore the same to its initial position.

2. An operating mechanism for a headlight switch comprising a rock shaft, means for pivotally mounting said rock shaft on the side wall of the body of an automobile, an operating member for said shaft arranged adjacent to the driver's knee, means for operatively connecting said rock shaft with said switch, and a spring acting on said operating device to return said parts to their initial positions.

3. In a device of the character described, an operating device comprising two parts adapted to be mounted respectively on the door of an automobile and on a fixed part of said automobile adjacent to said door, said parts being normally disconnected one from the other and having means for transmitting the movement of one part to the other part, one of said parts having means for actuating the same, and means for operatively connecting the other part with a head light switch.

4. In a device of the character described, an operating device comprising two shafts, means for rotatably supporting one of said shafts on the door of an automobile, and means for supporting the other of said shafts on the body of an automobile adjacent to said door, means for connecting one of said shafts with the head light switch, means for imparting rocking movement to the other shaft, the first mentioned shaft having a lateral projection and the last mentioned shaft having a part lying beneath said lateral projection and adapted to actuate the same when rocking movement is imparted to said last mentioned shaft.

5. In a device of the character described, an operating device comprising a rock shaft, means for rotatably supporting said shaft on the door of an automobile, an operating member connected with said shaft to impart rocking movement thereto, a laterally extending arm carried by said rock shaft and having a finger extending substantially parallel with said rock shaft, a second rock shaft, means for rotatably supporting said second rock shaft on the body of said automobile adjacent to said door, said second rock shaft having a laterally extending arm extending above the first mentioned rock shaft and arranged to be engaged by said finger, and means for connecting said second rock shaft with a head light switch.

In testimony whereof, I affix my signature hereto.

JOHN ELDY KENNEDY.